United States Patent
Schmid et al.

(10) Patent No.: US 6,930,654 B2
(45) Date of Patent: Aug. 16, 2005

(54) DEPLOYABLE ANTENNA REFLECTOR

(75) Inventors: Manfred Schmid, Immenstaad (DE); Dietmar Scheulen, Salem (DE); Reiner Barho, Salem (DE); Peter Weimer, Markdorf (DE)

(73) Assignee: Astrium GmbH, Munich (DE)

( * ) Notice: Subject to any disclaimer, the term of this patent is extended or adjusted under 35 U.S.C. 154(b) by 0 days.

(21) Appl. No.: 10/630,899

(22) Filed: Jul. 31, 2003

(65) Prior Publication Data

US 2004/0104861 A1 Jun. 3, 2004

(30) Foreign Application Priority Data

Jul. 31, 2002 (EP) .............................................. 02017163

(51) Int. Cl.⁷ .............................................. H01Q 15/20
(52) U.S. Cl. ...................................... 343/915; 343/912
(58) Field of Search ................................ 343/912, 915, 343/916, DIG. 2

(56) References Cited

U.S. PATENT DOCUMENTS

| | | | |
|---|---|---|---|
| 3,064,534 A | | 11/1962 | Tumavicus |
| 3,176,303 A | | 3/1965 | Holland |
| 3,541,569 A | * | 11/1970 | Acker et al. ................. 343/915 |
| 3,699,576 A | * | 10/1972 | Hoyer .......................... 342/10 |
| 3,715,760 A | * | 2/1973 | Palmer ....................... 343/915 |
| 4,315,265 A | | 2/1982 | Palmer et al. |
| 4,511,901 A | | 4/1985 | Westphal |
| 4,899,167 A | | 2/1990 | Westphal |
| 5,198,832 A | * | 3/1993 | Higgins et al. ............. 343/915 |
| 5,446,474 A | * | 8/1995 | Wade et al. ................. 343/915 |

FOREIGN PATENT DOCUMENTS

GB 2 105 113 3/1983

* cited by examiner

Primary Examiner—Tho Phan
(74) Attorney, Agent, or Firm—Crowell & Moring LLP

(57) ABSTRACT

A deployable antenna reflector comprising a central dish and a plurality of deployable sheet-like panels arranged around the central dish. The reflector further comprises a central supporting body, whereon the central dish is fixedly mounted and whereto the deployable sheet-like panels are hinged. The rotation axes of the individual deployable sheet-like panels are tilted with respect to the center point of the central dish. In the stowed configuration of the reflector, the deployable sheet-like panels are at least partially deflected in order to minimize the envelope of the reflector and that the panels relax upon deployment.

19 Claims, 5 Drawing Sheets

DEPLOYABLE ANTENNA REFLECTOR

This application claims the priority of European Patent Application No. 02017163, filed Jul. 31, 2002, the disclosure of which is expressly incorporated by reference herein.

SUMMARY OF THE INVENTION

The invention relates to a deployable antenna reflector.

Future communication satellites require medium size lightweight deployable antenna reflectors which can be stowed during launch on a satellite in a minimized available envelope and are deployed during mission.

It is the object of the invention to provide a deployable antenna reflector having a minimum envelope in its stowed configuration.

The reflector according to the invention is a so-called thin sheet reflector comprising sheet-like deployable panels preferably made of CFRP (carbon fiber reinforced plastic) arranged around a fixed central reflector dish. The rotation axes of the deployable panels are tilted with respect to the center point of the central dish in order to optimize the storage envelope. The panel movement is not directed radially with respect to the center point of the reflector dish but shows a certain deviation.

The reflector according to the invention allows to deflect the deployable panels during storage on their upper edges and to achieve the nominal well-defined parabolic reflector contour after deployment by relaxing the panel deflection.

Thus, a geometric minimization of the envelope of the stowed reflector is achieved not only by optimization of the panel deployment kinematics but also by deflection of the panels in the stowed configuration.

The diameter of the reflector in the deployed configuration is preferably in the range between 3 or 6 m. The preferred frequency band is X-Band or higher.

BRIEF DESCRIPTION OF THE DRAWINGS

These and other objects, features and advantages of the present invention will become more readily apparent from the following detailed description of currently preferred configurations thereof when taken in conjunction with the accompanying drawings wherein.

DETAILED DESCRIPTION OF THE PREFERRED EMBODIMENT

Figure 1:
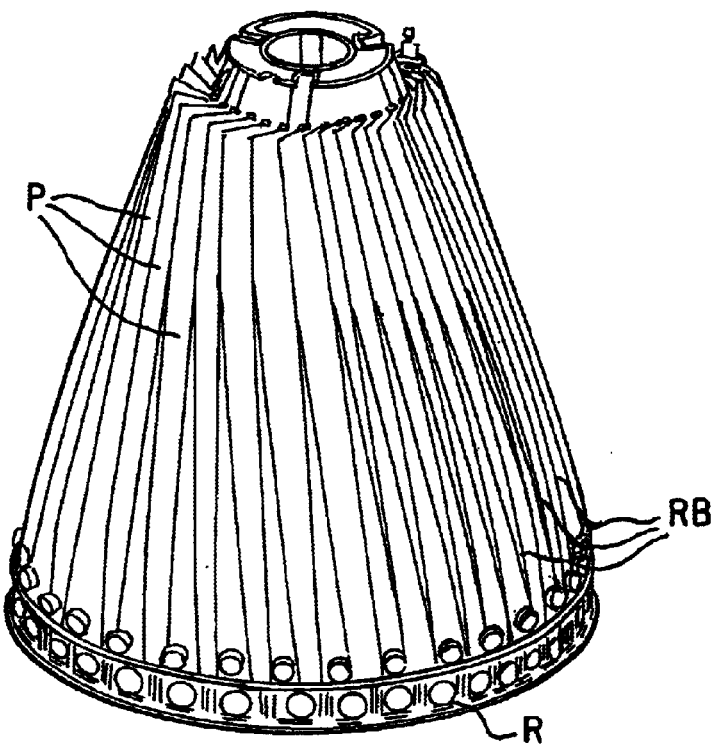
FIG. 1 shows a three-dimensional view of the reflector in the stowed configuration.
Figure 2:
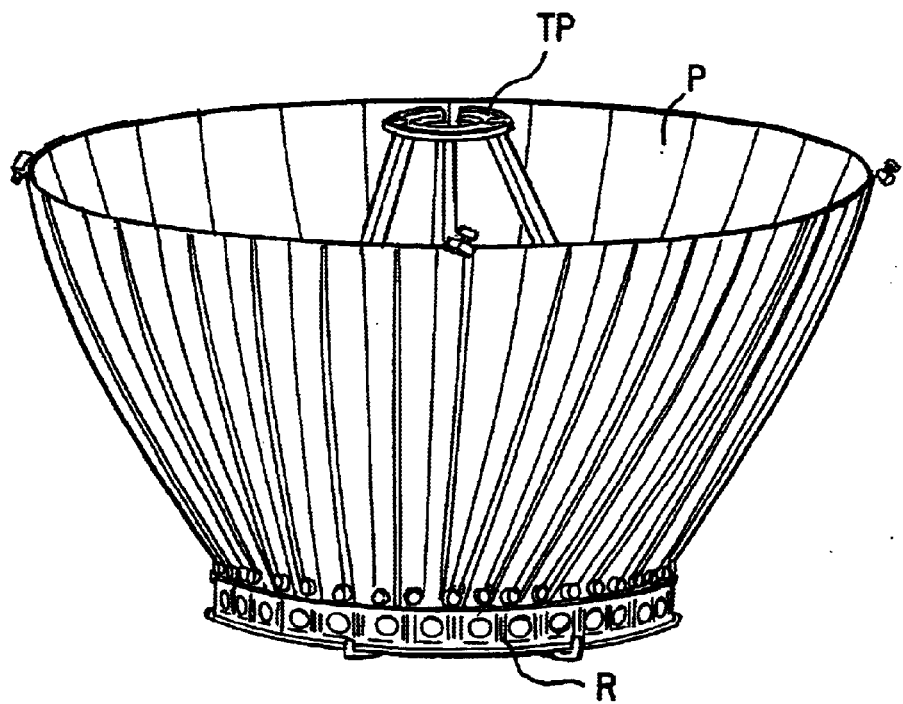
FIG. 2 shows a shows a three-dimensional side view of the reflector partially deployed.
Figure 3:
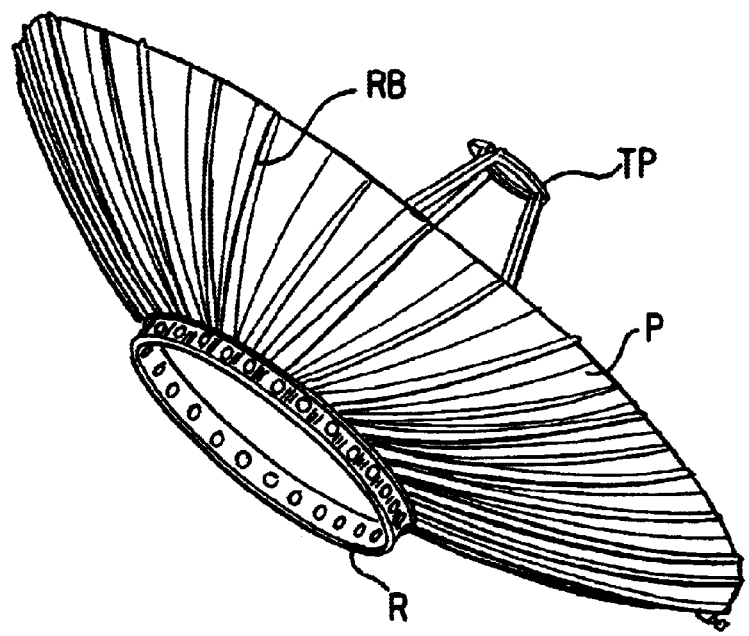
FIG. 3 shows a three-dimensional view of the reflector fully deployed.

FIG. 1 illustrates the reflector according to the invention in its stowed configuration, i.e., during launch. The individual sheet-like panels P made of CFRP are hingedly connected to a central supporting ring R which provides the structural interface to the satellite and to the tripod/feed TP assembly of the reflector as well. In addition, the central dish CD (FIG. 4) of the reflector, which is also designed as a thin-walled CFRP membrane, is fixedly connected to the central supporting ring R. Preferably, each thin sheet-like panel P is supported by a hollow CFRP rib RB which connects a panel P to the central dish DC via mechanical bushings. As can be understood from FIG. 1, the upper inner edges of the thin sheet-like panels P are bent in the stowed configuration. Upon deployment, relaxation of the panels P takes place (FIGS. 2 to 4).

Figure 4:
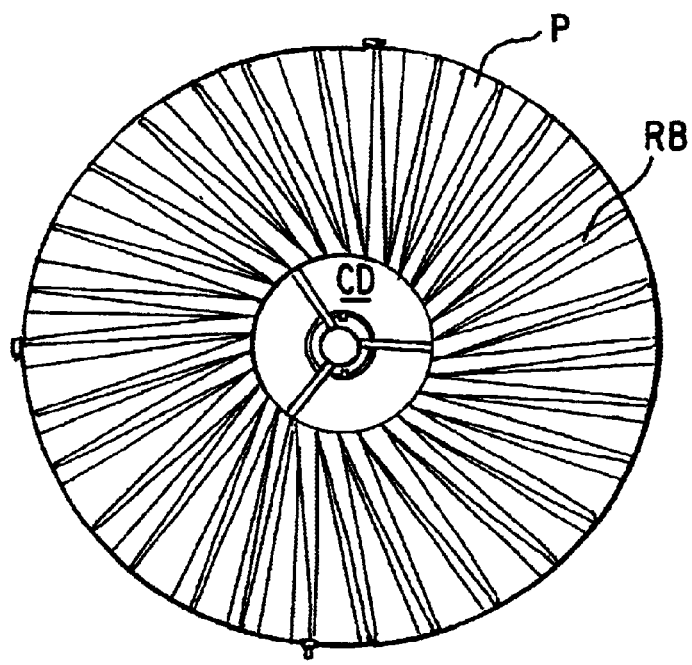
FIG. 4 shows a three-dimensional top view of the reflector fully deployed.

FIG. 4 shows the reflector in its fully deployed configuration. The central dish and the deployed sheet-like panels arranged around the central dish together form the overall reflector surface.

It is an essential feature of the invention that the deployment axis of each sheet-like panel P is tilted with respect to the center of the reflector in order to optimize geometrically for minimum stowed envelope. In other words, the longitudinal axis (alongside the ribs RB) of each individual sheet-like panel P is not oriented radially with respect to the center point of the central dish CD but in an inclined orientation in order to achieve geometric minimization during storage. As can be best seen in FIG. 4, the longitudinal axis of each panel is tangent to a circle having the center point of the central dish CD as its center.

Figure 9:
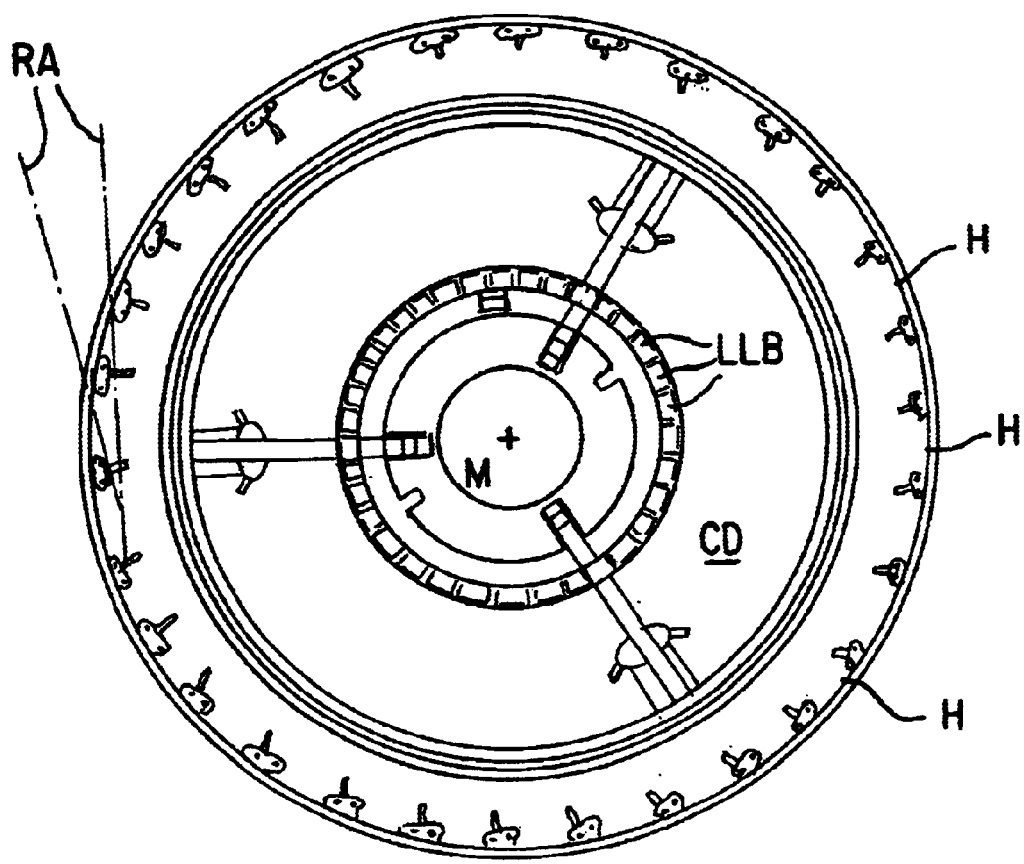
FIG. 9 shows a top view of the reflector with the sheet-like panels being omitted for reasons of clarity.

The aspect of tilted rotational axis with respect to the center point of the central dish is further explained by FIG. 9. It depicts a reflector according to the invention (top-view, the sheet-like panels have been omitted for the sake of clarity). The hinges H of the sheet-like panels P are arranged on a circle around the center point M of the central dish CD. The rotational axis RA of each hinge H is oriented in such a way that it does not form a tangent to said circle.

Preferably, the individual panels are not coupled after deployment in order to achieve a final parabolic contour which is not sensitive to any cross coupling effects between the panels. Each individual panel provides a well-defined parabolic contour and the upper rim of each panel can be fine-tuned in height completely independently from the other panels.

Figure 6:
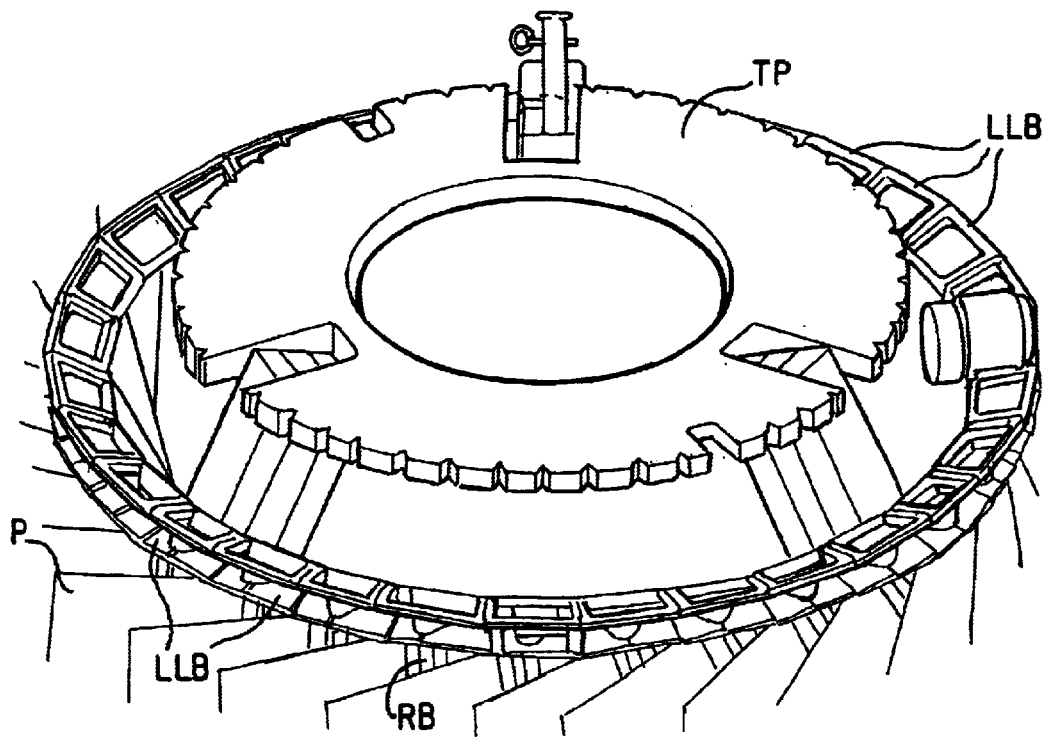
FIG. 6 shows a three-dimensional view of a launch lock device of the reflector.
Figure 7:
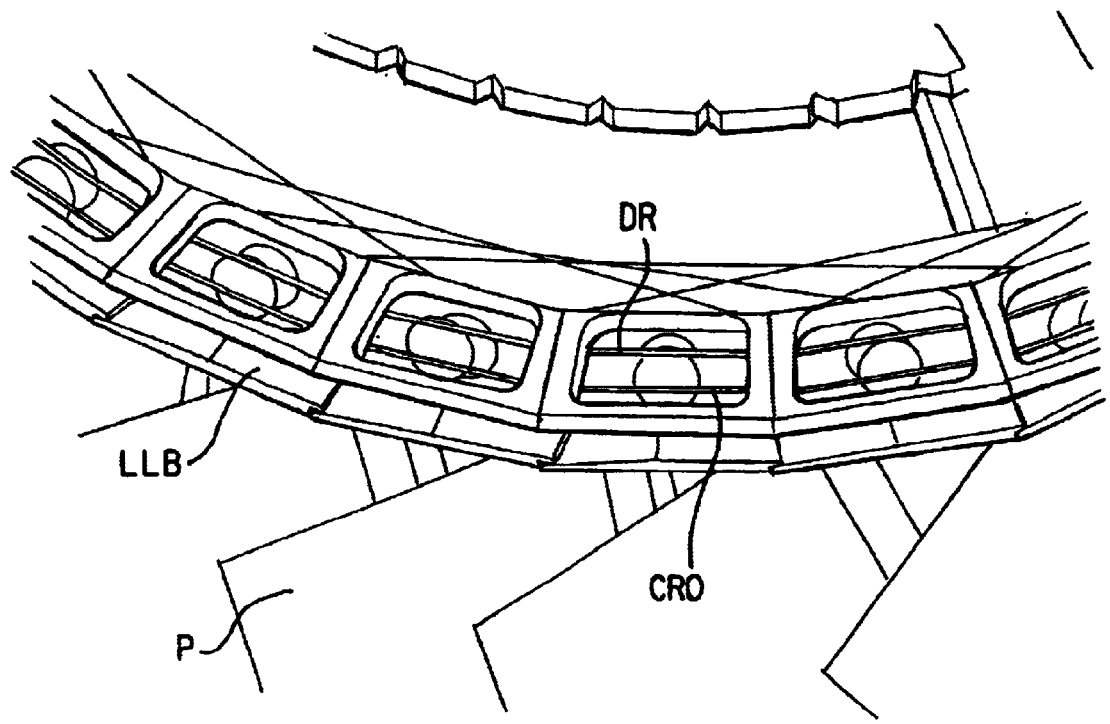
FIG. 7 shows a three-dimensional view of a detail of the launch lock device (compression rope and unloaded release damping rope)

On top (as seen in the stowed configuration) of each panel P and preferably supported by a rib RB, a metal launch lock bracket LLB is mounted in order to form a closed formlocking structural ring in the stowed configuration (FIG. 6). This structural ring is loaded by a circumferential rope CRO (FIG. 7) allowing to compress the ring segments formed by the brackets LLB with respect to each other during launch in order to form a stiff structural ring transferring moments and lateral forces as well. All launch loads are guided through the panel ribs RB down to the structural interface on the central supporting ring R.

Figure 5:
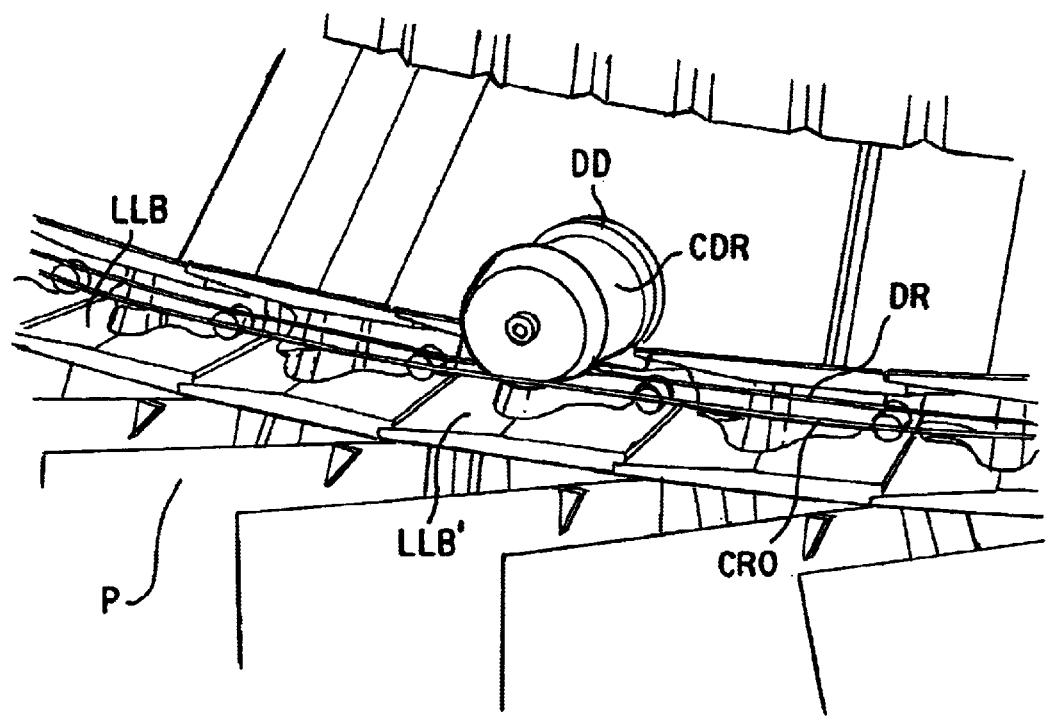
FIG. 5 shows a three-dimensional view of a deployment damping device of the reflector (on one panel only)
Figure 8:
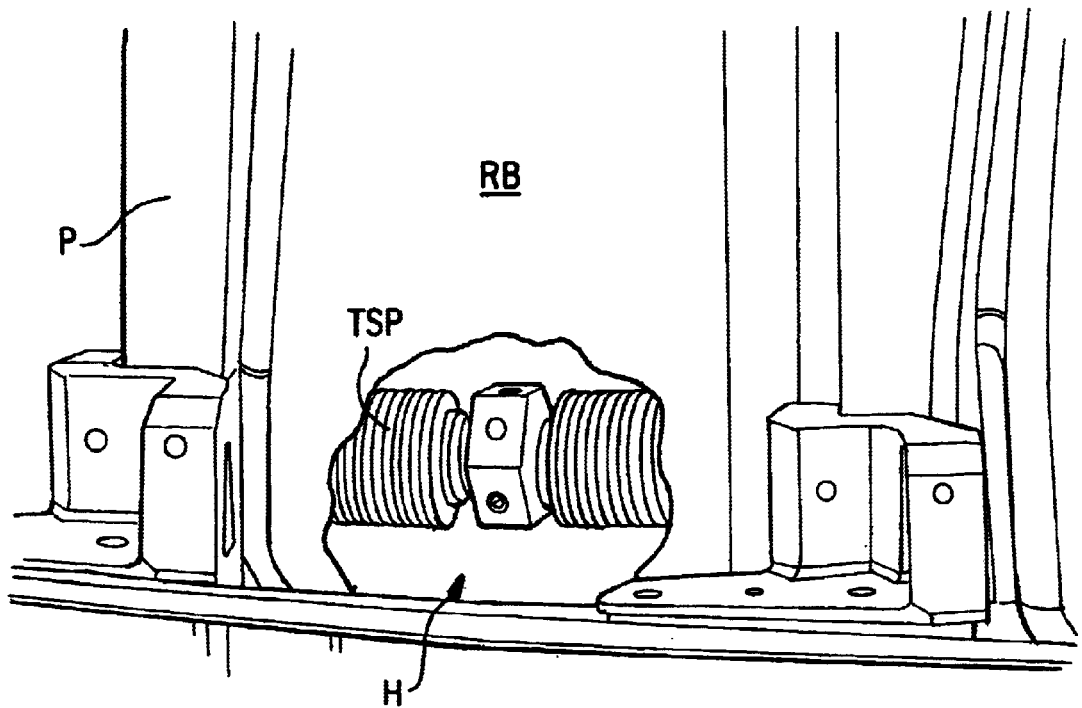
FIG. 8 shows a three-dimensional view of a panel hinge and the panel deployment drive (spring)

To release the reflector, the compression rope CRO is cut (FIG. 7) and the deployment is initiated by mans of torque springs TSP present at each hinge H of a sheet-like panel P and acting on the rotation axis thereof (FIG. 8). Turning now to FIG. 5, during deployment, the motion is damped by means of a damping device DD which is preferably mounted on top of a panel P. The damping device DD shown in FIG. 5 is fit into one launch lock bracket LLB', the shape of which has been adapted accordingly. A thin rope DR (FIGS. 5, 7) guided along all launch lock brackets LLB is pulled off a small cable drum CDR attached to the damping device DD so that the overall release motion of all panels P is damped simultaneously. The damping device may be an eddy current damping device but any other kind of damping device may be used. Synchronization of the deploying panels P is achieved inherently by the reflector design concept (FIG. 2). Only in the final deployed end position all panels are located one beside the other (with a certain overlap between neighboring panels; see FIG. 4) and no longer one behind the other.

After complete deployment about the spring loaded panel rotation axis close to the lower edge of each individual panel, the deployed end position is kept by way of a magnetic end stop element attached to the central supporting ring. This interface mates to the very end of the panel rib which carries an adequate metallic endstop fitting. The torque spring TSP still acting on the deployment RA axis suppresses residual backlash in the deployment hinge H.

The structural ring R is designed as a hollow CFRP ring providing the end stops for the deploying panels (FIG. 3) as well as the bearing of the deployment axis RA of each individual panel P.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A deployable antenna reflector, comprising:
 a central dish fixedly mounted on a central supporting body;
 a plurality of deployable sheet-like panels hinged to said central supporting body and arranged around the central dish;
 wherein the rotation axes of each of individual ones of said deployable sheet-like panels are tilted with respect to a center point of the central dish, and wherein, in a stowed configuration of the reflector, upper corner edges of the deployable sheet-like panels are at least partially deflected in order to minimize an envelope of the reflector and the panels relax upon entering a deployment configuration.

2. The deployable antenna reflector according to claim 1, wherein each of said sheet-like panels is supported by a rib which connects said each sheet-like panel to the central supporting body via mechanical bushings.

3. The deployable antenna reflector according to claim 2, wherein each sheet-like panel includes a torque spring acting on the rotation axis thereby driving the sheet-like panels from the stowed configuration into the deployed configuration.

4. The deployable antenna reflector according to claim 2, wherein a damping device is mounted on one of the sheet-like panels in order to simultaneously damp the motion of the sheet-like panels during deployment.

5. The deployable antenna reflector according to claim 2, wherein the central supporting body is a hollow ring made of carbon fiber reinforced plastic.

6. The deployable antenna reflector according to claim 2, wherein the deployable sheet-like panels are made of carbon fiber reinforced plastic.

7. The deployable antenna reflector according to claim 1, wherein each sheet-like panel includes a torque spring acting on the rotation axis thereby driving the sheet-like panels from the stowed configuration into the deployed configuration.

8. The deployable antenna reflector according to claim 7, wherein a damping device is mounted on one of the sheet-like panels in order to simultaneously damp the motion of the sheet-like panels during deployment.

9. The deployable antenna reflector according to claim 7, wherein the central supporting body is a hollow ring made of carbon fiber reinforced plastic.

10. The deployable antenna reflector according to claim 7, wherein the deployable sheet-like panels are made of carbon fiber reinforced plastic.

11. The deployable antenna reflector according to claim 1, wherein the central supporting body is a hollow ring made of carbon fiber reinforced plastic.

12. The deployable antenna reflector according to claim 1, wherein the deployable sheet-like panels are made of carbon fiber reinforced plastic.

13. The A deployable antenna reflector comprising:
 a central dish fixedly mounted on a central supporting body;
 a plurality of deployable sheet-like panels hinged to said central supporting body and arranged around the central dish;
 wherein the rotation axes of each of individual ones of said deployable sheet-like panels are tilted with respect to a center point of the central dish, and wherein, in a stowed configuration of the reflector, the deployable sheet-like panels are at least partially deflected in order to minimize an envelope of the reflector and the panels relax upon entering a deployment configuration, wherein brackets are mounted at the outer end of each sheet-like panel forming a closed formlocking structural ring in the stowed configuration of the reflector.

14. The deployable antenna reflector according to claim 13, wherein, in the stowed configuration of the reflector, the structural ring is loaded by a circumferential rope allowing to compress the individual brackets with respect to each other.

15. The deployable antenna reflector according to claim 13, wherein a damping device is mounted on one of the sheet-like panels in order to simultaneously damp the motion of the sheet-like panels during deployment.

16. The deployable antenna reflector according to claim 13, wherein the central supporting body is a hollow ring made of carbon fiber reinforced plastic.

17. A deployable antenna reflector, comprising:
 a central dish fixedly mounted on a central supporting body;
 a plurality of deployable sheet-like panels hinged to said central supporting body and arranged around the central dish;
 wherein the rotation axes of each of individual ones of said deployable sheet-like panels are tilted with respect to a center point of the central dish, and wherein, in a stowed configuration of the reflector, the deployable sheet-like panels are at least partially deflected in order to minimize an envelope of the reflector and the panels relax upon entering a deployment configuration, wherein a damping device is mounted on one of the sheet-like panels in order to simultaneously damp the motion of the sheet-like panels during deployment; and
 wherein the damping device cooperates with a cable drum on which a damping rope is wound said damping rope being guided around the formlocking ring in the stowed configuration.

18. A deployable antenna reflector, comprising:
- a central dish fixedly mounted on a central supporting body;
- a plurality of deployable sheet-like panels hinged to said central supporting body and arranged around the central dish;
- wherein the rotation axes of each of individual ones of said deployable sheet-like panels are tilted with respect to a center point of the central dish, and wherein, in a stowed configuration of the reflector, the deployable sheet-like panels are at least partially deflected in order to minimize an envelope of the reflector and the panels relax upon entering a deployment configuration;
- each of said sheet-like panels is supported by a rib which connects said each sheet-like panel to the central supporting body via mechanical bushings; and
- wherein brackets are mounted at the outer end of each sheet-like panel forming a closed formlocking structural ring in the stowed configuration of the reflector.

19. A deployable antenna reflector comprising:
- a central dish fixedly mounted on a central supporting body;
- a plurality of deployable sheet-like panels hinted to said central supporting body and arranged around the central dish;
- wherein the rotation axes of each of individual ones of said deployable sheet-like panels are tilted with respect to a center point of the central dish, and wherein, in a stowed configuration of the reflector, the deployable sheet-like panels are at least partially deflected in order to minimize an envelope of the reflector and the panels relax upon entering a deployment configuration, wherein each sheet-like panel includes a torque spring acting on the rotation axis thereby driving the sheet-like panels from the stowed configuration into the deployed configuration; and
- brackets are mounted at the outer end of each sheet-like panel forming a closed formlocking structural ring in the stowed configuration of the reflector.

* * * * *